United States Patent [19]

Mack

[11] 4,398,083
[45] Aug. 9, 1983

[54] ELECTRIC HEATING APPARATUS FOR PRE-HEATING AND MOLDING FILLET-FORMING WAX STRIPS

[76] Inventor: Charles H. Mack, N88 W14981 Jefferson Ave., Menomonee Falls, Wis. 53051

[21] Appl. No.: 277,518

[22] Filed: Jun. 26, 1981

Related U.S. Application Data

[63] Continuation of Ser. No. 56,589, Jul. 11, 1979, abandoned.

[51] Int. Cl.³ .......................... H05B 1/02; H05B 3/02
[52] U.S. Cl. ..................................... 219/479; 219/240; 219/242; 219/354; 219/421; 219/478; 219/521
[58] Field of Search ................ 219/242, 348, 354, 347, 219/521, 421, 220, 240, 476, 477, 478, 479, 480

[56] References Cited

U.S. PATENT DOCUMENTS

| | | | |
|---|---|---|---|
| 2,429,241 | 10/1947 | Schuldiner | 219/348 X |
| 2,532,033 | 11/1950 | Parks | 219/347 X |
| 3,120,599 | 2/1964 | Hilgers | 219/220 X |
| 3,178,556 | 4/1965 | Cornwall et al. | 219/242 X |
| 3,665,158 | 5/1972 | Froedge | 219/521 X |
| 3,800,122 | 3/1974 | Farmer | 219/242 X |
| 3,902,043 | 8/1975 | Rogan | 219/242 |

Primary Examiner—A. Bartis
Attorney, Agent, or Firm—Francis J. Bouda

[57] ABSTRACT

An electric heating apparatus for softening and molding fillet wax strips used in foundry molds and castings includes a housing supporting a plurality of electric radiant heaters, such as lamps, above a platform for holding strips of fillet wax during preheating. An electronic control circuit is provided in the housing for varying the heat output of the radiant heaters and includes a thermostat located between the heater and the platform for limiting the temperature to prevent melting of the wax strips. Electrically heat fillet-forming tools, supported in holder on the housing during non-use periods, are provided for forming the preheated wax strips after application thereof to a mold. The tools are provided with ball-shaped tips and the housing is provided with a separate adjustable electronic control circuits for each tool so that the heat output of each tool can be adjusted to a temperature appropriate to the particular wax being worked and the size of the ball-shaped tip.

5 Claims, 5 Drawing Figures

U.S. Patent    Aug. 9, 1983    Sheet 1 of 2    4,398,083
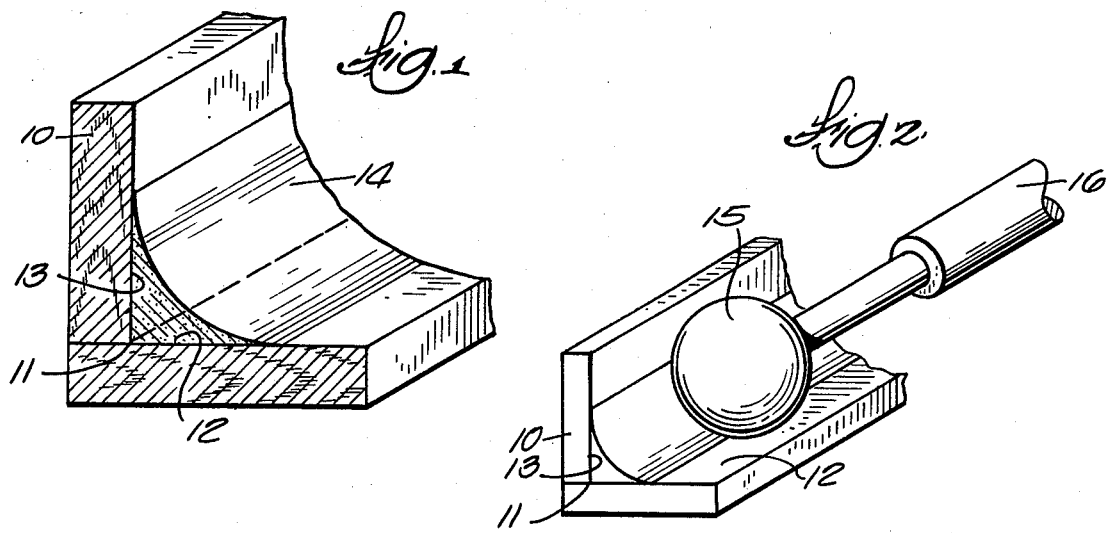
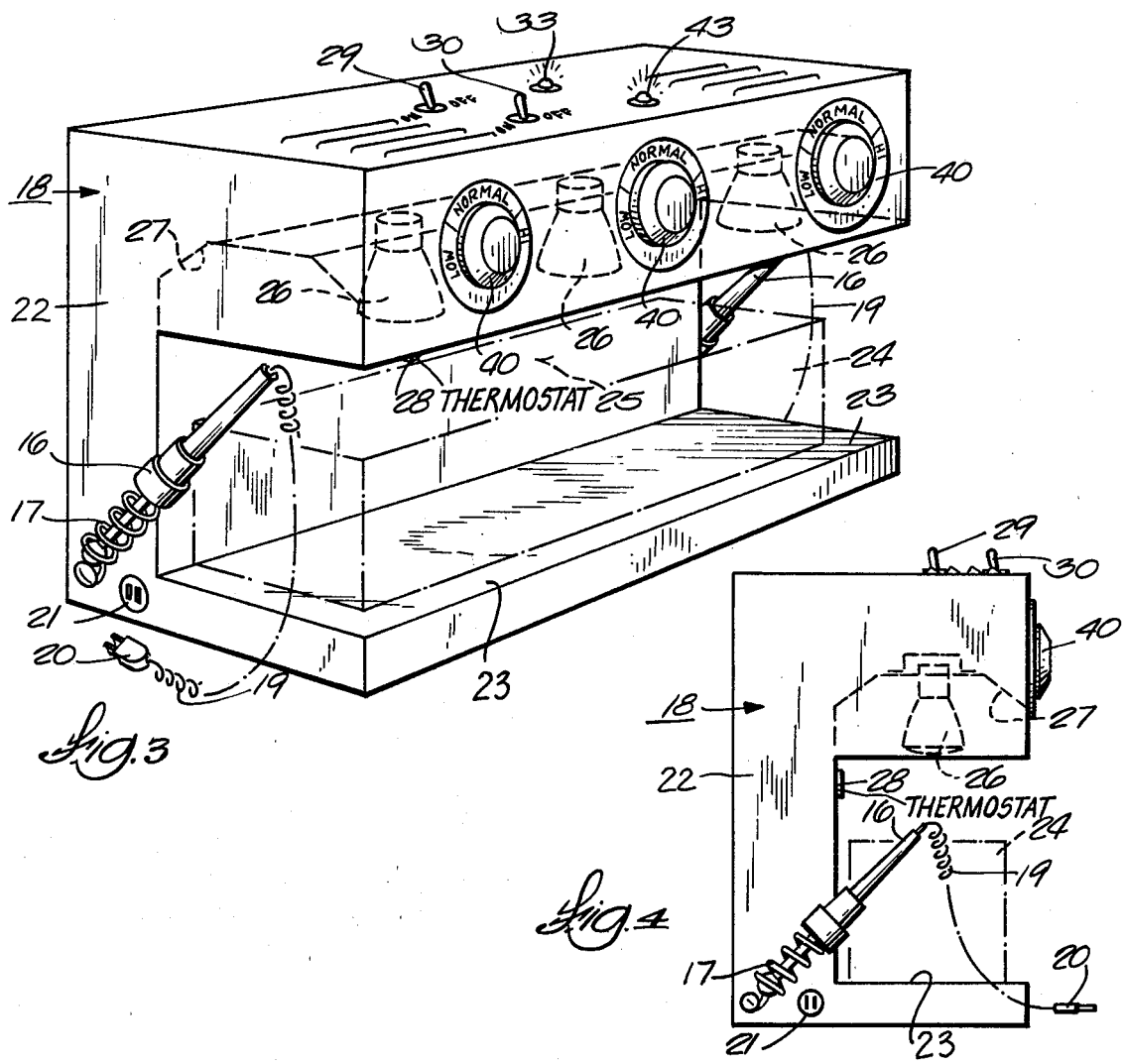

ELECTRIC HEATING APPARATUS FOR PRE-HEATING AND MOLDING FILLET-FORMING WAX STRIPS

This is a continuation of application Ser. No. 056,589 filed July 11, 1979 now abandoned.

BACKGROUND OF THE INVENTION

The present invention relates to a device for heating, softening and molding fillet wax of the type used in foundry molds and castings.

This invention relates to my co-pending patent application Ser. No. 056,589 filed July 11, 1979 (now abandoned).

In foundries which specialize in the casting of bathroom fixtures, such as sinks, bowls, basins, lavoratories and the like, the work is generally done in large, open areas which are unheated and, therefore, have extremely severe operating conditions in the winter time. It is important that the wax used in forming the fillets in the molds used for casting be at the proper degree of softness and flexibility for easy application, and that the fillet-forming tool be kept at the proper temperature for forming the wax into the desired shape in the mold.

In the past, gas-heated tools have been employed, but these are both dangerous and inconvenient because the tools have constantly to be reheated, and it is very difficult to maintain the temperature of the tool at a constant degree of heat.

Therefore, I have invented a unique device which insures that the fillet-wax material is kept at the proper temperature, prior to use, so that it can be easily applied to the mold; and, furthermore, that there is a direct correlation between the temperature of the preheated wax and the temperature of the fillet-forming tool, so that the proper forming temperatures will always ba applied to the selected wax material.

SUMMARY OF THE INVENTION

The device of the present invention includes, in operative combination, a pre-heating station which is constructed and arranged to receive a container of standard, string-like or cord-like strips of wax and to hold the temperature surrounding that container at a constant, pre-determined temperature.

Operatively interconnected to the pre-heating station is a fillet-forming tool, the tip of which has a ball-shape of a diameter selected appropriately for the forming of the fillet. The invention also includes a temperature control mechanism which automatically keeps the ball-end of the fillet-forming tool at the proper temperature so as quickly and easily to form the quarter-round fillet when the tool is applied to the pre-heated wax after a strip of wax is filled into the corner of the mold.

The wax-heating and molding device of the present invention is relatively simple and uncomplicated; but, nevertheless, extremely effective to provide a heretofore unachievable, uniform temperature for both wax and fillet-forming tool, it being necessary for the operator only to set the device appropriately for the wax being used to insure that the pre-heating area is at the right temperature for such material and that the temperature of the fillet-forming tool is also at the correct temperature for working that particular wax.

A principal object of the present invention is to provide a combination pre-heater and wax-forming fillet-tool.

A further object of the present invention is to provide a wax-working system which provides proper temperature for the wax strips prior to use and which also provides a proper temperature for the fillet-forming tool used on the wax.

A further object of the present invention is to provide a simple, uncomplicated heater for fillet-forming wax used in foundries and the like.

Still another object of the present invention is to provide in an electric wax heater appropriate connections and control so that the device, adjusted for the wax being used, keeps the pre-heating temperature and the fillet-forming tool temperature at correct levels for that particular wax.

With the above and other objects in view, a further understanding of the present invention will be achieved by reference to the following detailed description and drawings.

DETAILED DESCRIPTION

For the purpose of illustrating the invention, there is shown in the accompanying drawings a form thereof which is at present preferred, although it is to be understood that the various instrumentalities of which the invention consists can be variously arranged and organized, and the invention is not limited to the precise arrangements and organizations of the instrumentalities herein shown and described.

In the drawings wherein like reference characters indicate like parts:

FIG. 1 is a perspective view of a wax fillet formed in the corner of a casting mold.

FIG. 2 is a perspective view of fillet-forming tool of the present invention as it is used to form a quarter-round radius fillet in a casting mold.

FIG. 3 is a perspective view of a heater of the present invention illustrating a box of wax-strips disposed in the housing and in operative location beneath the pre-heater, and with the fillet-forming tool operatively connected to the housing.

FIG. 4 is a side elevational view of the heater of FIG. 3.

Figure 5:
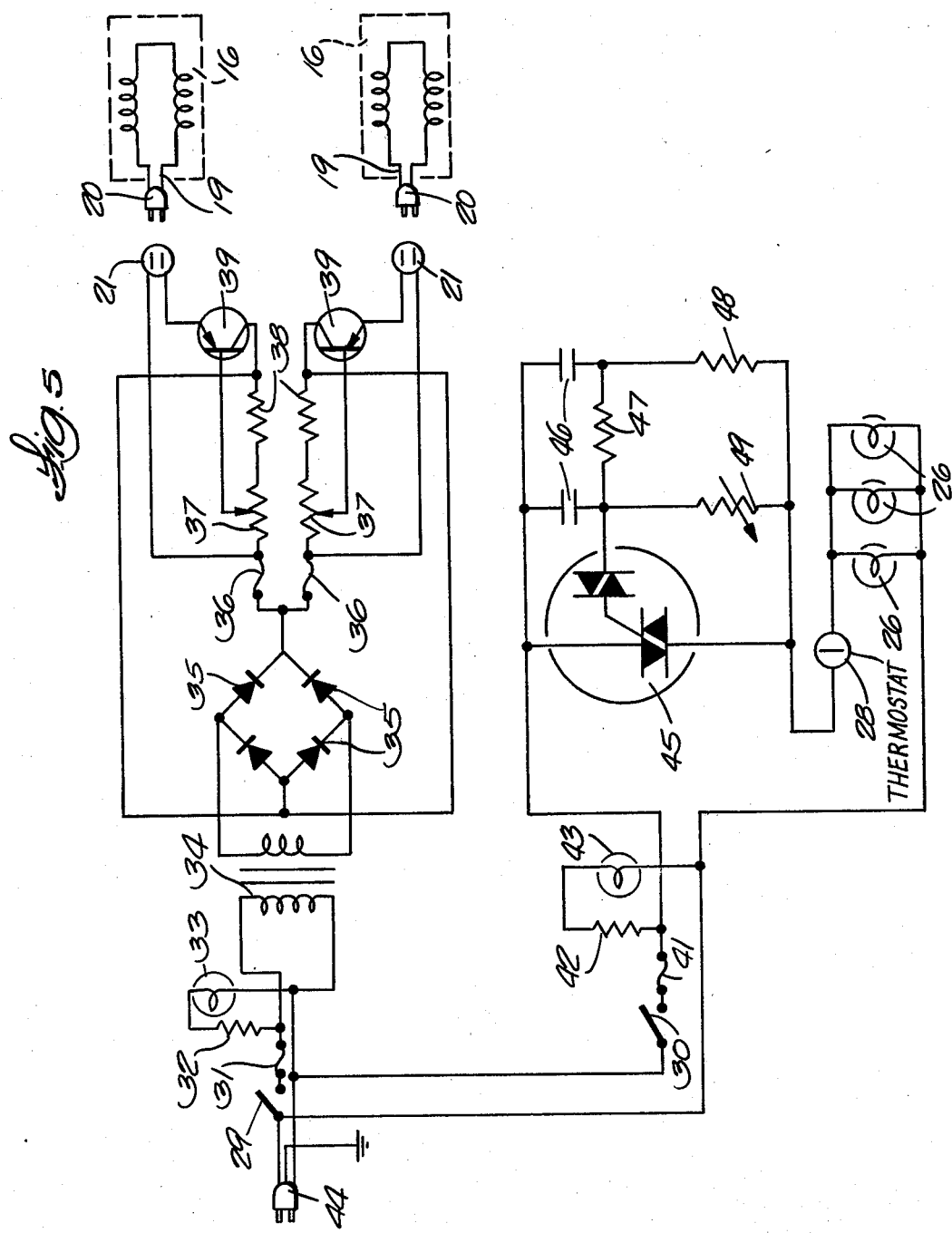
FIG. 5 is a schematic diagram of a power supply which varies the voltage and, therefore, the temperature of the fillet-forming tool, and it is also a schematic diagram of the electric circuit of the pre-heater mechanism.

In FIG. 1, I illustrate the corner of mold such as that used in casting bathroom fixtures such as sinks, bowls, basins, and the like. This mold 10 may be formed of wood and has a corner 11 defined by the surfaces 12 and 13.

In the corner 11, a fillet of wax 14 has been shaped to provide a rounded corner between the surfaces 12 and 13.

As can be seen in FIG. 1, the fillet is generally a quarter-round blending of the surfaces 12 and 13. This is done by moving the heated ball-end 15 of the fillet-heating tool 16 along a strip of wax which has been laid in the corner 11.

The radius of the ball 15 is chosen, as appropriate to the radius of the fillet desired, and the temperature is controlled by the circuit shown in FIG. 5 so as to heat the strip of wax to proper temperature above the melting point thereof, and then by drawing the ball along the corner 11 on the top of a strip of wax to form the radius in the wax-fillet 14.

The fillet-forming tool 16 may be supported in an appropriate tool holder 17, mounted on the side of the heater 18, as shown in FIG. 3. The fillet-forming tool 16 has an electric cord 19 connected thereto with a plug 20, which can be operatively connected with the female receptacle 21 in the side of the housing 22 of heater 18.

The electrical circuit which controls the temperature of the fillet-forming tool 16 is shown in FIG. 5 and is contained within the housing 22 of the heater 18.

The housing 22 has a platform 23 which provides a support for a box 24 of wax strips (not shown) contained therein. When the cover of the box 24 is removed, the box can be placed on the platform 23 with the open end 25 of the box 24 disposed beneath and closely adjacent the lamps or heater elements 26.

The heater elements 26 may be infra-red lamps or other suitable heating lamps well known to the electrical industry, and they are disposed in the upper part of the housing 22, closely above the open end 25 of the box 24.

Thus when the lamps are energized, the heat therefrom is directed downwardly by the reflector 27 to insure that the wax strips contained in the box 24 are kept warm at a temperature which permits easy use and provides flexibility of strips, but which does not heat the strips above the melting point. This is critical because in the cold atmosphere of a foundry in winter time, if the wax strips are cold, they become brittle and inflexible and cause problems for the user. On the other hand, they must not be heated to a temperature which would cause them to stick to each other and the box 24.

To insure the temperature of the heater and, therefore, the wax is correct, I provide a thermostat 28 adjacent the platform 23 above the box 24 and below the heaters 26.

This thermostat 28 is shown in FIG. 5 and is part of the control mechanism to insure that the contents of the box 24 are kept at the appropriate temperature.

In FIG. 3, I have illustrated switches 29 and 30 which control the electric circuits of the present invention.

Switch 29 controls the electricity to the pair of fillet-forming tools 16, whereas switch 30 controls the electricity to the pre-heater circuit shown schematically in FIG. 5.

The fillet-forming tools 16 are connected by the plugs 20 to the sockets 21. The current is supplied from a line connector 44 in an appropriate circuit to the sockets 21 in appropriate voltage to keep the fillet-forming tools 16 at the correct temperature. That circuit is shown as including fuse 31, a resistor 32, a neon indicator lamp 33, and a transformer 34 (which has an input voltage of 115 volts and an output voltage of 48 volts).

Four rectifiers 35 are at the output side of the transformer and lead to circuit-protecting fuses 36, potentiometers 37, resistors 38, and transistors 39, all appropriately interconnected as shown to the female receptacle 21.

The potentiometers 37 are operatively connected to the knobs 40 on the outside of the housing 22. By appropriate movement of the knob 40, the potentiometers can be adjusted so that the voltage supplied to the fillet-forming tools is appropriate for the selected wax. The knobs can be pre-set so that the temperature of the fillet-forming tools is kept constantly at the proper temperature.

In FIG. 5 I show the schematic diagram of the electrical circuit for the pre-heater portion of the present invention. This includes the switch 30, and fuse 41, resistor 42 and neon indicator lamp 43. Also in this circuit is the thermostat 28 which is connected directly to the heater elements or lamps 26.

Also shown in this circuit is a quadrac 45, which is comprised essentially of a pair of SCR's and a pair of trigger diodes assembled back-to-back. The potentiometer 49 can be adjusted so that the triggers are applied to the gates anywhere between the beginning and the end of both the positive and the negative half cycles. Thus, from zero to full wave power can now be supplied to the elements 26. The circuit also includes capacitors 46 and fixed resistors 47 and 48.

As can be seen from the illustration of FIG. 3 and the schematics diagram of FIG. 5, the box 24 of fillet wax can be placed on the platform 23 beneath the heater elements or lamps 26 and when the switch 30 is activated, the heating elements 26 will be energized to provide heat directly above the box 24 as limited by the thermostat 28.

By adjusting potentiometer 49 to low, normal, or high setting by central knob 40 in FIG. 3, it switches quadrac 45 which controls current to lamps 26 on for a longer or shorter period of time, which controls current to lamps 26, to give them a radiant heat output in accordance with the chosen setting. The thermostat 28 is, therefore, a means of protecting against exceedingly high radiant heat output from lamps 26 which could, if not controlled, liquify the wax 24 on platform 23.

When the switch 29 is activated, power is supplied into the female receptacles 21 so as to energize the heating element 50 within the fillet-forming tool 16. I have chosen to indicate separate dial controls 40 for the potentiometers 37 and, thus, a separate temperature can be directed to each of the tools 16.

If the tools have a ball of the same material and diameter, then the dials would be set at the same indicating mark and under such circumstances a single dial and single potentiometer would be sufficient.

However, because balls of different diameter can be placed on the tools 16, I provide separate controls so the temperature will be the same for each of the tools, irrespective of the diameter of the ball. Thus balls of different diameters can be used for the same wax, which should have the same melting temperature applied by the tool, regardless of the diameter or size of the ball.

Once the wax is chosen and the melting temperature has been determined, the control 49 can be set to keep that wax at the appropriate pre-heated temperature, and the knobs 40 can be appropriately set for proper melting temperature for the ball at the end of the tool.

Once the settings of the knobs have been made, a simple flip of the switches 29 and 30 will activate the heating elements or lamps 26 and tools 16 and insure that the temperature of the wax in the box 24 and the temperature of the tools 16 are correct for that type of wax.

It is to be understood that the present invention may be embodied in other specific forms without departing from the spirit or special attributes hereof, and it is therefore desired that the present embodiments be considered in all respects as illustrative, and therefore not restrictive, reference being made to the appended claims rather than to the foregoing description to indicate the scope of the invention.

I claim:

1. An electric heating apparatus for fillet wax, said apparatus including:
   a housing a platform in said housing for holding strips of wax,
an electric radiant heater element supported by said housing and disposed above the platform in spaced relation thereto,
an electric circuit in said housing for energizing the heater element,
a thermostat in the circuit and located between the heater element and the platform for limiting the ambient temperature of the space between said heater element and said platform
said circuit including means for varying the voltage applied to said heater element and thereby the heat output thereof,
a fillet-forming tool having a tip,
a holder on said housing for supporting said fillet-forming tool during non-use periods, said tool including
an electric heating element to heat the tip,
an electric circuit in said housing and connected to said tool by a flexible power cord for energizing the element,
said heating element circuit including a potentiometer for adjusting the voltage and thereby regulating the heat output of the heating element,
said heater element being operative so that the wax is kept at a soft but not melting temperature.

2. The electric heating apparatus of claim 1 wherein the means for varying the voltage applied to said heater element includes a quadrac in circuit with the heater element.

3. The electric heating apparatus of claim 1 wherein the electric circuit for the heating apparatus includes a transformer having a 115 volt primary and a 48 volt secondary as the power supply for the heating element.

4. The electric heating apparatus of claim 1 wherein the heating element circuit includes a transistor connected in series with the heating element, and the potentiometer is arranged to control the current flow through the transistor to the heating element.

5. The electric heating apparatus of claim 1 wherein the means for varying the voltage applied to the heater element includes a quadrac in circuit with the heater element and the heating element circuit includes a rectifier and a step-down transformer having a 115 volt primary and a 48 volt secondary in series with the potentiometer as the power supply for the heating element.

* * * * *